United States Patent [19]

Umemura

[11] Patent Number: 4,590,582

[45] Date of Patent: May 20, 1986

[54] IMAGE DATA PROCESSING APPARATUS FOR PERFORMING SPATIAL FILTERING OF IMAGE DATA

[75] Inventor: Yoshiyuki Umemura, Tochigi, Japan

[73] Assignee: Tokyo Shibaura Denki Kabushiki Kaisha, Kawasaki, Japan

[21] Appl. No.: 539,401

[22] Filed: Oct. 6, 1983

[30] Foreign Application Priority Data

Oct. 7, 1982 [JP] Japan .............................. 57-176700
Dec. 28, 1982 [JP] Japan .............................. 57-233565

[51] Int. Cl.$^4$ ...................... G06F 3/153; G06F 15/31; H04N 5/32
[52] U.S. Cl. .................................. 364/724; 364/415; 358/111; 358/160; 378/901
[58] Field of Search ..................... 364/400, 413–415, 364/417, 724, 728; 358/111, 21 R, 36–37, 160, 166–167; 378/4–5, 901

[56] References Cited

U.S. PATENT DOCUMENTS

| | | | |
|---|---|---|---|
| 4,231,100 | 10/1980 | Eggermont | 364/724 |
| 4,257,102 | 3/1981 | Horiba et al. | 364/414 |
| 4,335,307 | 6/1982 | De Vries et al. | 358/111 X |
| 4,350,998 | 9/1982 | Verhoeven | 358/111 |
| 4,394,684 | 7/1983 | Verhoeven | 358/111 |
| 4,468,697 | 8/1984 | Verhoeven | 358/111 |
| 4,503,459 | 3/1985 | Haendle et al. | 358/111 |

OTHER PUBLICATIONS

H. C. Andrews, *Computer Design*, "Semiconductor Advances Boost Digital Image Processing System Performance", vol. 18, No. 9, Sep. 1979, pp. 93–101.

P. E. Anuta et al., IEEE Conference on Pattern Recognition and Image Processing, Jun. 14–17, 1982, "Resolution Matching for Registration of Dissimilar Images", *IEEE Computer Society*, pp. 327–332.

*Primary Examiner*—Gary V. Harkcom
*Attorney, Agent, or Firm*—Cushman, Darby & Cushman

[57] ABSTRACT

In a digital radiographic technique, a spatial filtering process has been widely introduced. The image data processing apparatus includes a first storage device for storing original image data in a digital form which is used for medical diagnosis. A filtering device is provided for performing a filtering function to the original image data so as to control spatial frequency characteristics of the original image data. A second storage device is used for storing the filtered image data derived from the filtering device, and a first multiplexer device is provided for multiplying the filtered image data which is stored in the second storage device, by a first parameter so as to give a first weighted value to the filtered image data. A second multiplier device is used for multiplying the original image data which is stored in the first storage means, by a second parameter so as to give a second weighted value to the original image data, and a parameter input terminal device is provided for producing the two parameters and delivering the same to the first and second multiplier devices respectively. An adder is provided for performing a linear combination operation between the first and second multiplied image data so as to obtain an added image data whose spatial frequency characteristics are controlled to be different from that of the original image data.

11 Claims, 13 Drawing Figures

IMAGE DATA PROCESSING APPARATUS FOR PERFORMING SPATIAL FILTERING OF IMAGE DATA

BACKGROUND OF THE INVENTION

1. Field of the Invention

The present invention relates to an image data processing apparatus which performs spatial filtering of image data so as to extract and display image data effective for diagnosis by a physician in a medical image diagnosis apparatus.

2. Description of the Prior Art

Digital signal processing techniques are more frequently being used in medical image processing by medical image processing apparatuses such as X-ray CT apparatuses or digital radiography apparatuses. In particular, spatial filtering has an important role as a technique for performing smoothening, or edge enhancement.

However, at present, spatial filtering is utilized for slight edge enhancement with fixed frequency characteristics for filtering. Although such spatial filtering is effective for diagnosis, data effective for diagnosis which are provided together with unnecessary data, cannot be effectively utilized. A digital radiography apparatus for obtaining an X-ray transmission image in the form of digital data has a density resolution of 200 to 500 tone or gradation (gray) levels. In contrast to this, a display device, e.g., a CRT has only about 30 gradation levels. Moreover a viewer has the ability to distinguish about 10 to 20 gradation levels. For this reason, there have been many types of image data which are included in the original image data and which are effective for diagnosis and yet which cannot be used for reproducing fine contrast.

SUMMARY OF THE INVENTION

It is an object of the present invention to provide an image data processing apparatus which can arbitrarily and finely control the frequency characteristics of digital image data which is finally obtained using two different parameters during filtering of the digital image data.

It is another object of the present invention to provide an image data processing apparatus which simplifies the processing method and improves the processing speed during filtering of digital image data.

It is still another object of the present invention to provide an image data processing apparatus which can provide desired frequency characteristics by keeping one of two different parameters fixed and varying the other by a simple method during filtering of digital image data.

These objects are accomplished by providing an image data processing apparatus in accordance with the present invention. The present invention includes a first storage device for storing original image data in a digital form which is used for medical diagnosis, and a filtering device for performing a filtering function of the original image data so as to control spatial frequency characteristics of the original image data. A second storage device is provided for storing the filtered image data derived from the filtering means. A first multiplier device is provided for multiplying the filtered image data which is stored in the second storage means, by a first parameter so as to give a first weighted value to the filtered image data. A second multiplier device is provided for multiplying the original image data which is stored in the first storage means, by a second parameter so as to give a second weighted value to the original image data. A parameter input terminal device is provided for producing the two parameters and delivering the same to the first and second multiplier devices respectively, and an adder device is used for performing a linear combination operation between the first and second multiplied image data so as to obtain an added image data whose spatial frequency characteristics are controlled to be different from that of the original image data.

BRIEF EXPLANATION OF THE DRAWINGS

The present invention may be best understood with reference to the accompanying drawings, in which:

FIG. 2B is a representation of an input pixel of the input image data;

DETAILED DESCRIPTION OF THE PREFERRED EMBODIMENTS

Figure 1:
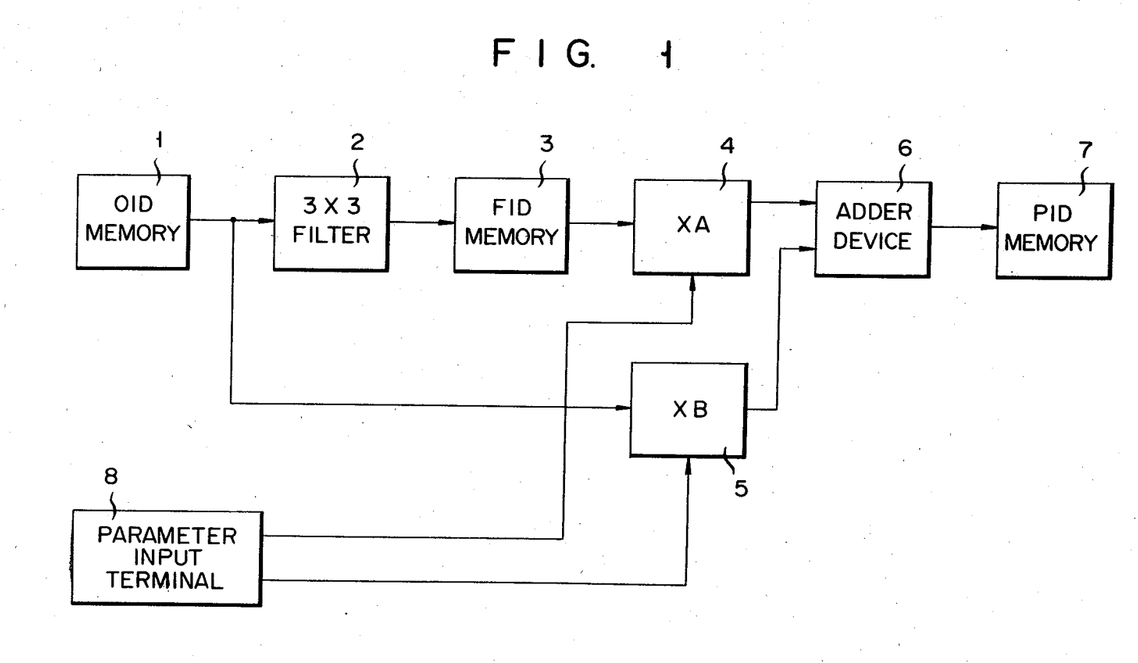
FIG. 1 shows a schematic diagram of an image data processing apparatus according to one preferred embodiment.

FIG. 1 is a block diagram of an embodiment of the present invention.

Referring to FIG. 1, an original image data storage memory (referred to as "OID" memory) 1 stores digital image data obtained by scanning an object (not shown) by a known digital radiography apparatus or the like. An output from the OID memory 1 is connected to a 3×3 filter 2 and to a multiplier 5 having a multiplication factor of B. The filter 2 performs a filtering process to be described later. An output from the filter 2 is supplied to a filtered image data storage memory (referred to as "FID" memory) 3 and is stored therein. An output from the FID memory 3 is supplied to a multiplier 4 having a multiplication factor of A.

An output from a parameter input terminal 8 is used for controlling the two multipliers 4 and 5 described above. Outputs from the multipliers 4 and 5 are supplied to an image data adder device (referred to as "adder device") 6 which performs a linear combination to be described later. The sum image data from the adder device 6 is accumulated in a processed image data storage memory (referred to as "PID" memory) 7.

The mode of operation of the apparatus described above will now be described. The filter 2 performs the filtering process of smoothening or enhancing the original image data stored in the OID memory 1. The filtered image data from the filter 2 is stored in the FID memory 3. The filtered image data stored in the FID memory 3 is multiplied by A by the first multiplier 4, and the multiplication product is supplied to the image data adder device 6. Meanwhile, the original image data from the OID memory 1 is multiplied by B by the second multiplier 5 and the multiplication product is supplied to the adder device 6. These data are subjected to linear combination such that image data having desired frequency characteristics can be obtained.

The mode of operation will be described in further detail.

Figure 2A:
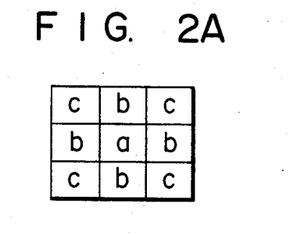
FIG. 2A is a representation of a multiplier arrangement of the 3×3 filter.
Figure 2B:
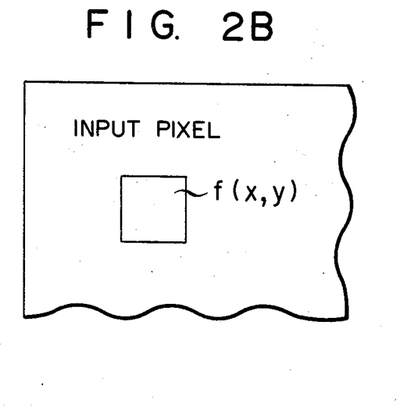
FIG. 2B is a partially shown illustration of an input image data in which one input pixel is marked.

A description will be made with reference to a 3×3 linear non-recursive type two dimensional filter 2 of support size which is adopted in this embodiment. The filter 2 is a basic and important device in image processing and is effective for noise removal, sharpness control, edge enhancement and the like. A 3×3 filter is a filter which performs a convolution given by equation (1) below between a matrix of coefficients a, b and c as shown in FIG. 2A and one input pixel (x, y) as shown in FIG. 2B.

$$cf(x-1, y-1)+bf(x, y-1)+cf(x+1, y-1) \\ +bf(x-1, y)+af(x, y)+bf(x+1, y) +cf(x-1, \\ y+1)+bf(x, y+1)+cf(x+1, y+1) \quad (1)$$

When the spatial frequency characteristics in the x- and y-directions of a 3×3 filter having such filter coefficients a, b and c are designated by u and v, the spatial frequency characteristics of the filter can be given by:

$$H(u, v)=2 \cos (u+v)+2b \cos v+2c \cos (u-v) +2b \cos u+a \quad (2)$$

$$H(u, 0)=(4c+2b) \cos u+(a+2b) \quad (3)$$

$$H(0, v)=(4c+2b) \cos v+(a+2b) \quad (4)$$

When the coefficients a, b and c are properly selected, various frequency characteristics can be obtained within a range such that they can be expressed in the form of a function H. As a result, this filter can be used as either a low-pass filter or a high-pass filter.

The above-mentioned features will now be described in further detail. The degree of freedom with respect to the u-axis and v-axis is 2, and is determined by parameters A and B (i.e., multiplications A and B of the multipliers 4 and 5, respectively) given by equations (5) and (6) below:

$$4c+2b=A \quad (5)$$

$$a+2b=B \quad (6)$$

Using these parameters A and B, equation (3) can be rewritten as equation (7) below:

$$H(u)=A \cos u+B \quad (7)$$

The greater the parameter A, the greater the slope of the frequency response curve of the high-pass filter. When the parameter A has a negative value, the filter serves as a low-pass filter. The parameter B defines the ratio of the component of the original image data in the output data. The greater the parameter B, the closer the output image data is to the original image data. The smaller the parameter B, the more significant are the high-pass or low-pass characteristics of the filter. In this manner, the two parameters A and B are significant values in determining the filter characteristics, and can be conveniently used as a measure for determining the spatial frequency characteristics.

Assume that the 3×3 filter has the characteristics given by:

$$H(u)=A_1 \cos u+B_1 \quad (8)$$

When input image data is designated by F(u, v) and filtered image data is designated by $G_1(u, v)$, we obtain:

$$G_1=HF \quad (9)$$

Taking into account the linear combination between the original image data F and the filtered image data $G_1$, output image data $G_2$ is given by:

$$\begin{aligned} G_2 &= A_2 G_1 + B_2 F \\ &= A_2 HF + B_2 F \\ &= (A_2 A_1 \cos u + A_2 B_1 + B_2)F \end{aligned} \quad (10)$$

where $A_2$ and $B_2$ are weight coefficients of the linear combination. Provided the parameters A and B which determine the filter function are given, we can obtain relation (11) below for the coefficients $A_2$ and $B_2$ of the linear combination:

$$\left. \begin{aligned} A_2 A_1 &= A \\ A_2 B_1 + B_2 &= B \end{aligned} \right\} \quad (11)$$

Then, the coefficients $A_2$ and $B_2$ can be obtained from equation (11) above as:

$$\left. \begin{aligned} A_2 &= A/A_1 \\ B_2 &= B - B_1 A/A_1 \end{aligned} \right\} \quad (12)$$

Thus, the same filtering result as that of equation (7) above can be obtained from the input parameters A and B. From this, the following conclusion is obtained. That is, if original image data is filtered by a given 3×3 filter and thereafter the original image data and filtered image data are linearly combined with suitable weight coefficients, a desired filtering process as given by equation (7) can be realized.

When a 3×3 filter wherein all the coefficients are 1 is considered, the filter does not involve multiplication and only involves nine addition operations, so that high-speed data processing can be performed. The frequency characteristics of such a filter can be given as:

$$H(u, v)=2 \cos (u+v)+2 \cos v+2 \cos (u-v) +2 \cos u+1 \quad (13)$$

$$H(u, 0)=6 \cos u+3 \quad (14)$$

$$H(0, v)=6 \cos v+3 \quad (15)$$

Figure 2C:
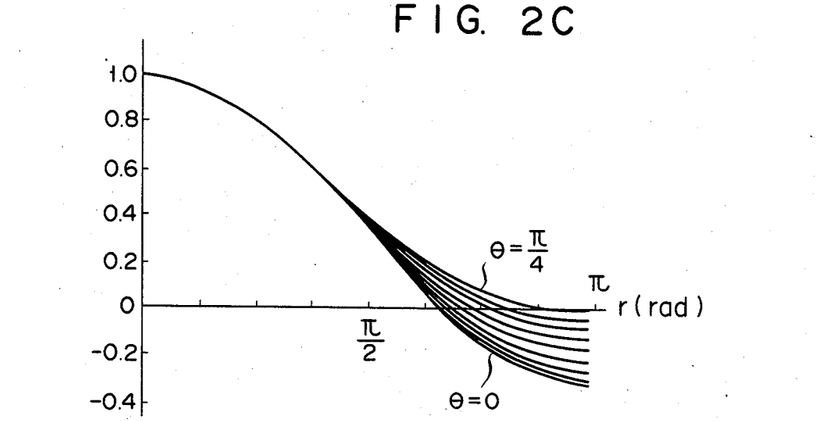
FIG. 2C is a graphic representation of the spatial frequency characteristics of a filter.

The direction dependency of these spatial frequency characteristics can be represented as shown in FIG. 2C using the direction (angle) $\theta$ as a parameter.

When various parameters of the multipliers 4 and 5 are used for a single original image data, the original image data can be filtered once by the 3×3 filter 2.

Then, the original image data and the filtered image data stored in the FID memory 3 are multiplied by desired weight coefficients (i.e., parameters) to perform linear combination. Thus, high-speed processing is further facilitated.

Figure 3:
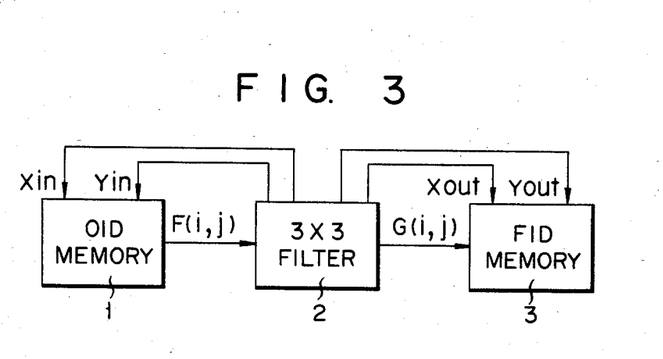
FIG. 3 is an illustration for explaining interface circuits with respect to the filter.

FIG. 3 shows in detail the interface relationship between the 3×3 filter 2 and the surrounding OID memory 1 and the FID memory 3. When input pixel data is designated by $F_{ij}$ and output pixel data is designated by $G_{ij}$, a 3×3 filter wherein all the coefficients are 1 is given by:

$$G_{ij}=F_{i-1,j-1}+F_{i,j-1}+F_{i,j+1}+F_{i-1,j}+F_{i,j}+F_{i+1,j}+F_{i-1,j+1}+F_{i,j+1}+F_{i+1,j+1} \quad (16)$$

In order to calculate output pixel data $G_{ij}$ corresponding to the x- and y-coordinates of i and j, respectively, input pixel data $F_{i,j}$ and data of the surrounding eight pixels having the pixel $F_{i,j}$ as the center are read out from the OID memory 1 storing the image pixel data F therein. The readout data are added together. Signals $X_{in}$ and $Y_{in}$ produced from the 3×3 filter 2 constitute x- and y-address signals for reading out the input pixel data and surrounding pixel data from the OID memory 1. The readout input pixel data F is sequentially supplied to the filter 2. The output pixel data $G_{ij}$ from the filter 2 is stored in the FID memory 3. Signals $X_{out}$ and $Y_{out}$ are the x- and y-address signals for storing the output pixel data $G_{ij}$ in the memory 3.

Figure 4A:
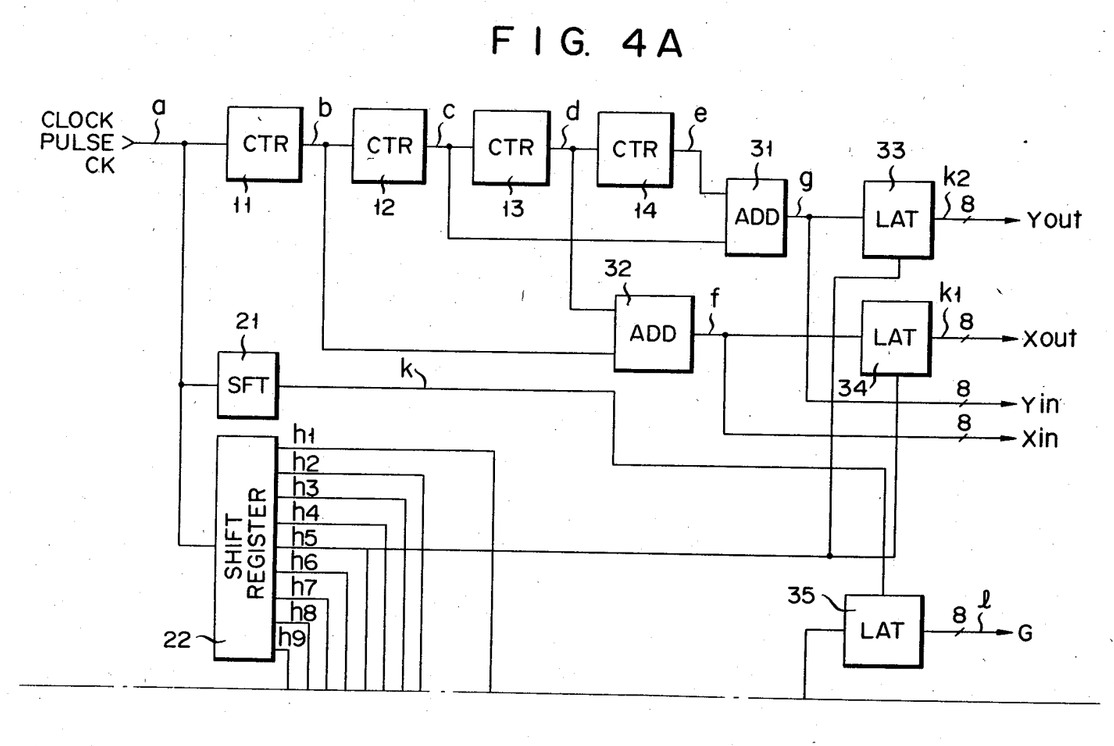
FIGS. 4A and 4B are block diagrams of the internal circuitry of the filter.
Figure 4B:
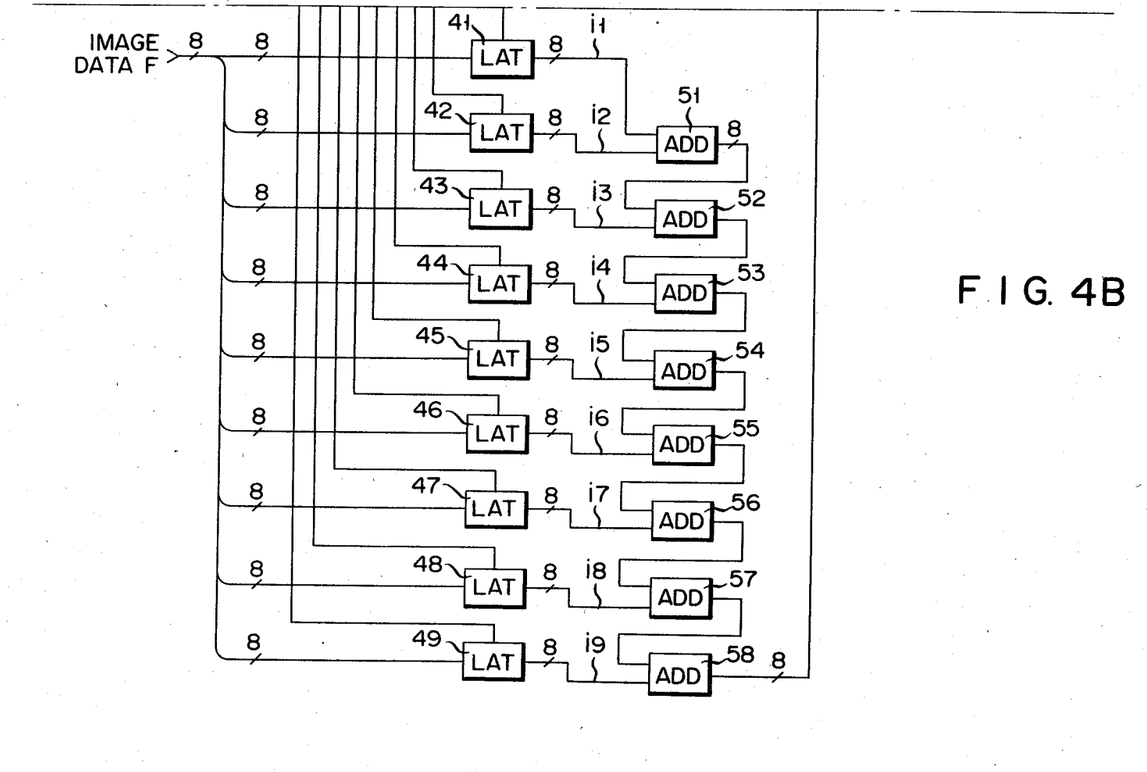
Figure 5:
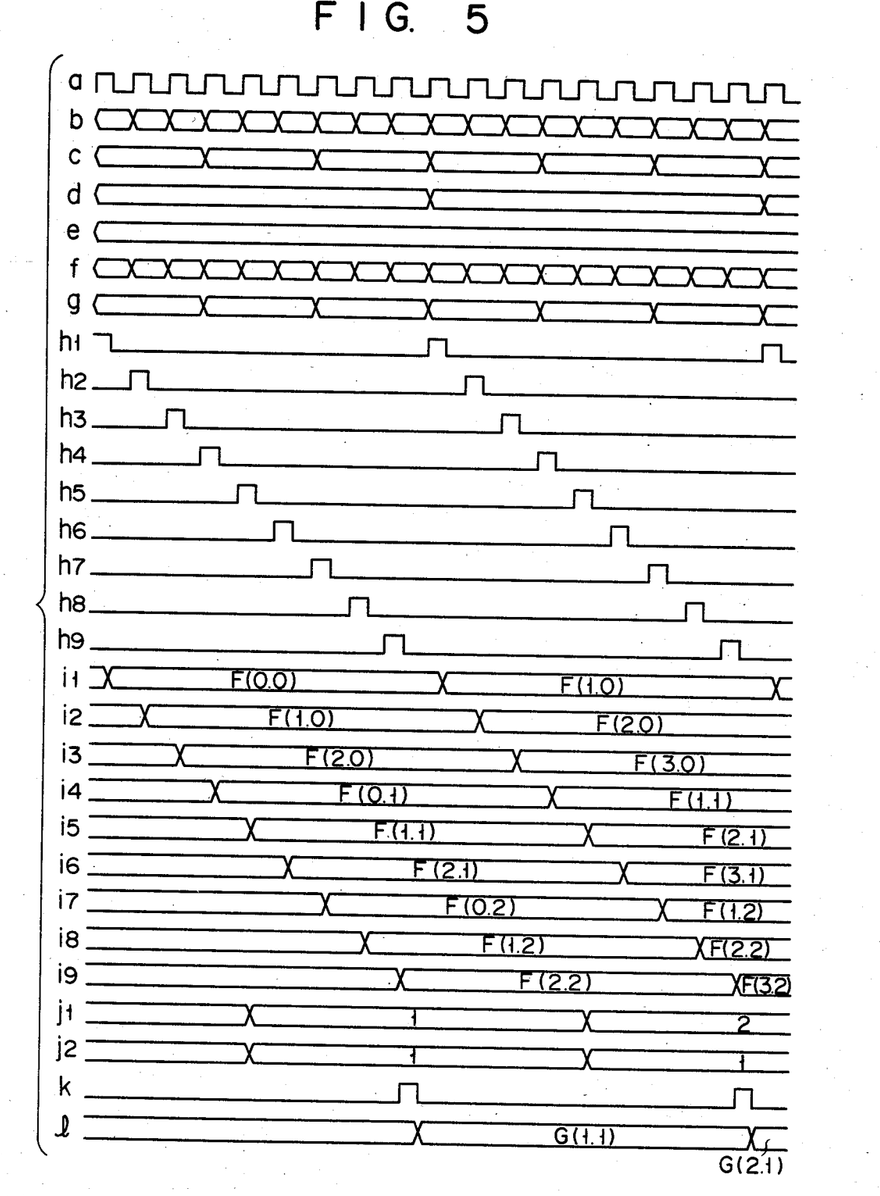
FIG. 5 is a timing chart of operations of the filter shown in FIGS. 4A and 4B.

FIGS. 4A and 4B are block diagrams showing the internal circuit of the 3×3 filter 2, and FIG. 5 is a timing chart for explaining the mode of operation of the filter 2. Reference symbols a to l in FIGS. 4A and 4B correspond to waveforms a to l in FIG. 5. A signal a is a clock pulse CK and is supplied to a counter 11. The counter 11 frequency-divides the clock pulse a to produce an output signal b. The signal b is supplied to another counter 12. The counter 12 frequency-divides the signal b to obtain an output signal c. The signal c is supplied to a further counter 13. The counter 13 frequency-divides the signal c to obtain an output signal d. The signal d is supplied to a still further counter 14 to be frequency-divided to obtain an output signal e. The signals b and d are added by an adder 32 which produces a signal f. The signals c and e are added by another adder 31 which produces a signal g. The signal f corresponds to the signal $X_{in}$ shown in FIG. 3, while the signal g corresponds to the signal $Y_{in}$ shown in the same figure. Accordingly, the signals $X_{in}$ and $Y_{in}$ are signals for sequentially scanning an area of a 3×3 matrix having the input pixel as the center. The input pixel is then shifted by one pixel in the x-direction and the corresponding 3×3 matrix area is scanned. When scanning of one line is completed in this manner, the input pixel is shifted by one pixel in the y-direction, and a similar scanning operation is repeated. The signals $X_{in}$ and $Y_{in}$ constitute x- and y-addresses for reading out the image data from the OID memory 1. The pixel data from the memory 1 is parallel-supplied to latches 41 to 49 as image data F. The timings at which the data F is latched in these latches 41 to 49 are determined by control signals $h_1$ to $h_9$ from a shift register 22. An output timing from the shift register 22 is synchronous with the clock pulse a. Individual image data, i.e., F(0,0), F(1, 0), F(0, 1), F(2, 0), F(1, 1), F(2, 1), F(0, 2), F(1, 2) and F(2, 2) are latched in the latches 41 to 49, respectively, and appear as outputs $i_1$ to $i_9$. The signals $i_1$ to $i_9$ are added by adders 51 to 58.

A calculation of the term $$\sum_{k_2=1}^{l}\sum_{k_1=1}^{l} F(i+k_1, j+k_2)$$

is thus completed. The calculation result is latched in a latch 35 at a timing determined by an output signal k from a shift register 21, which latch then produces a signal l. The signal l constitutes output image data G of the 3×3 filter 2 and is supplied to the FID memory 3 for storing the filtered data. X- and y-address signals $X_{out}$ and $Y_{out}$ for storing the output image data G in the FID memory 3 are obtained by latching the signals $X_{in}$ and $Y_{in}$ by latches 33 and 34 at a timing of the control signal $h_5$.

Figure 6:
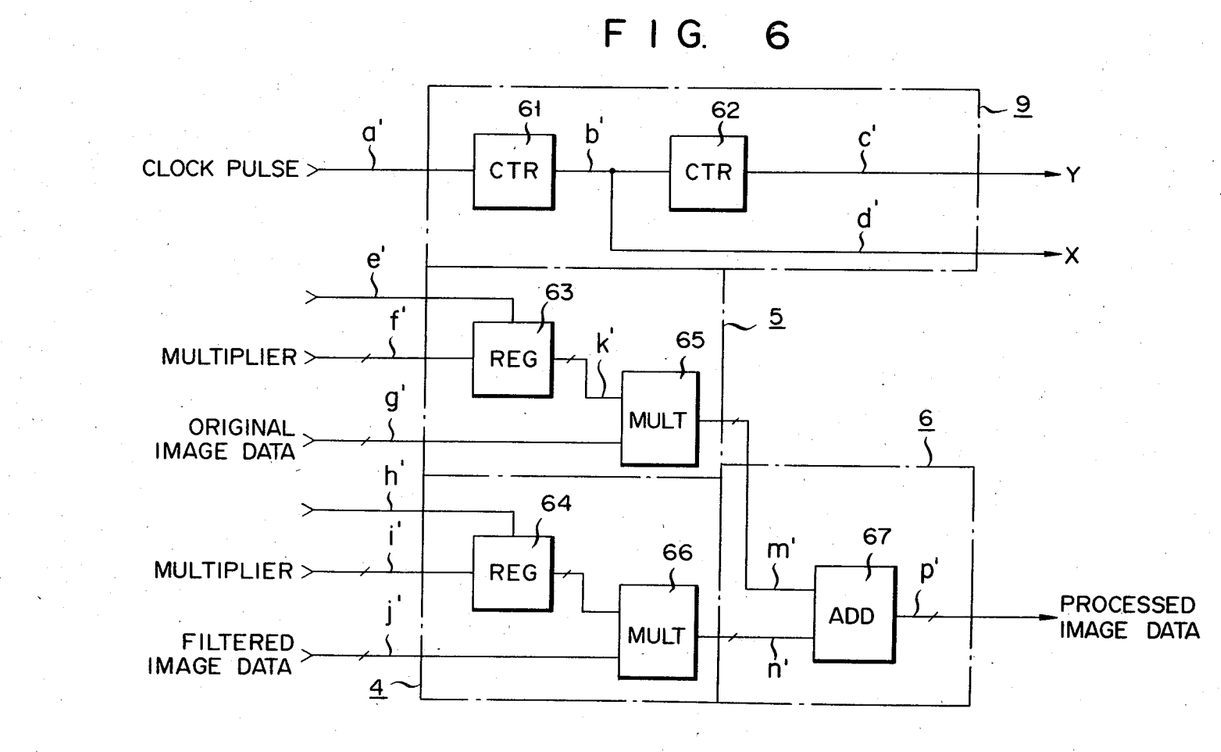
FIG. 6 shows a block diagram of the image data adder device.

FIG. 6 is a block diagram for explaining the linear combination of the original image data and the filtered image data from the 3×3 filter. The linear combination circuit comprises an address signal generator 9, the multipliers 4 and 5, and the adder device 6. In the address signal generator 9, a clock pulse a' is supplied to a counter 61 which frequency-divides the pulse a' to produce a signal b'. The signal b' is supplied to another counter 62 to be further frequency-divided to produce a signal c'. The signals c' and b' (d') are used as x- and y-address signals for accessing the memories 1, 3 and 7 shown in FIG. 1. The signals a' to d' in FIG. 6 correspond to the signals a to d in FIG. 1, respectively. Readout of the input image data and writing of the processed image data are executed by scanning one line after another from the left to the right of the image shown in FIG. 2B. The readout original image data is supplied as a signal g' to one input terminal of a multiplier element 65 of the multiplier 5 and the filtered image data is supplied as a signal j' to one input terminal of a multiplier element 66 of the multiplier 4. Registers 64 and 63 of the respective multipliers 4 and 5 store the parameters A and B supplied from the parameter input terminal 8. The parameters A and B are produced as signals k and k' in response to shift control signals h' and e' and are supplied to the other input terminal of each of the multiplier elements 66 and 65. Then, the multiplier elements 65 and 66 multiply the respective image data by the corresponding weight coefficients, and output data (m', n') from the multiplier elements 65 and 66 are supplied to an adder 67 to be added together. In this manner, the linear combination is performed, and processed image data p' is obtained. The processed image data p' is stored in a predetermined area of the PID memory 7 which is selected by signals X and Y from the address signal generator 9.

Figure 7:
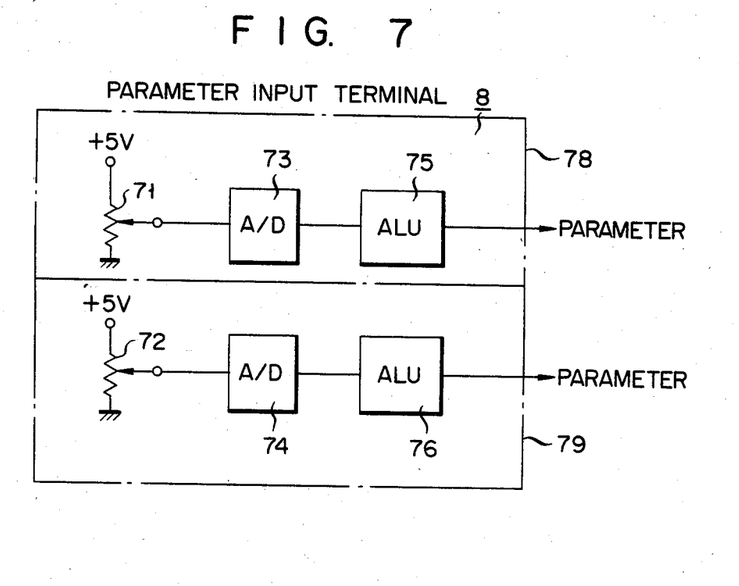
FIG. 7 is an internal circuit diagram of the parameter input terminal.

FIG. 7 is a block diagram showing an example of the parameter input terminal 8 shown in FIG. 1. The terminal comprises first and second parameter generators 78 and 79. In these generators 78 and 79, variable resistors 71 and 72 are respectively connected between a power supply of +5 V and ground. The analog signals obtained from the resistors 71 and 72 are converted into digital signals by A/D converters 73 and 74 and the digital signals are supplied to ALUs 75 and 76, respectively. The ALUs 75 and 76 convert the input signals into parameters and produce the parameters A and B. The ALUs 75 and 76 perform the calculation according to equation (1) such that the analog signals from the resistors correspond to the coefficients of the linear combination. When the parameters supplied from the resistors 71 and 72 are designated by $A_{in}$ and $B_{in}$ and the coefficients of the linear combination are designated by $AL_{in}$ and $BL_{in}$, we obtain:

$$AL_{in} = A_{in}/6 \quad (17)$$

$$BL_{in} = B_{in} - A_{in}/2 \quad (18)$$

provided that the 3×3 filter shown in FIG. 1 is a filter wherein all the coefficients are 1.

Figure 8:
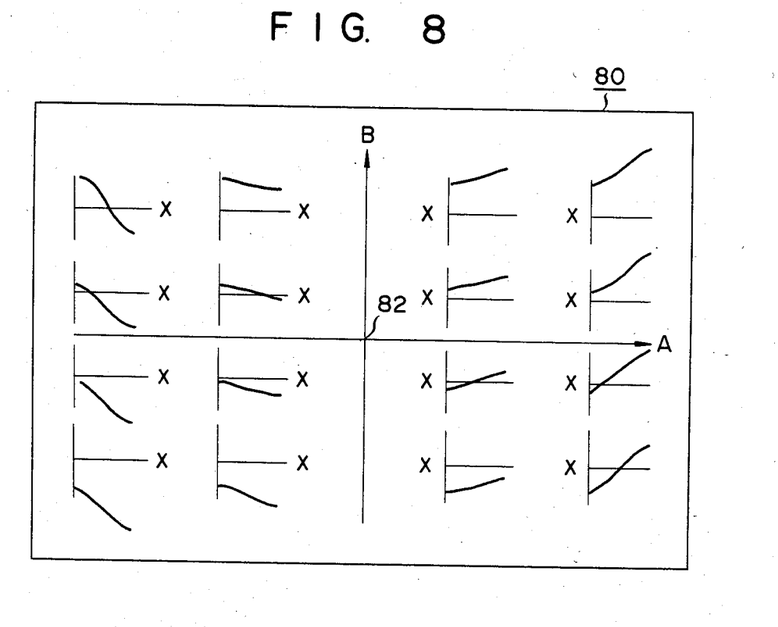
FIG. 8 shows an illustration of another embodiment of the parameter input terminal.

A modification of the parameter input terminal will now be described. In general, in a parameter input terminal, a set of parameters A and B must be designated. This may be said to be equivalent to the selection of one point on the x-y plane. Accordingly, a parameter input terminal 80 as shown in FIG. 8 may be conveniently used, together with an input device such as a digitizer or a light pen device which is capable of designating a single point on the x-y plane. In FIG. 8, parameters A and B are plotted along the two orthogonal axes, that is, the x- and y-axes. FIG. 8 shows the frequency characteristics for 16 typical points. As the parameter A increases (to the right from a central point 82), a sharper high-pass filter frequency response curve is obtained. As the parameter A becomes increasingly negative (to the left from the central point 82), sharper low-pass characteristics are gradually obtained. The parameter B corresponds to the ratio of the original image data component to the processed image data. As the parameter B increases (upward from the central point 82), the processed image data becomes closer to the original image data. It is to be noted that points other than the 16 points indicated in the figure can be designated. In this manner, by designating a point by its coordinates, the spatial frequency characteristics to be obtained can be visually confirmed by the operator, thus improving the operability of the parameter input terminal.

According to the present invention, a set of parameters can be selected using a parameter input terminal, so that desired spatial frequency characteristics may be designated. Various types of characteristics can be finely designated. In this case, the frequency characteristics to be obtained can be visually confirmed from the values of the parameters. Accordingly, a spatial filtering apparatus with improved operability can be provided. In accordance with the embodiment using a parameter input terminal which allows designation of the parameters by coordinate points, fine designation can be performed and operability is improved due to easy confirmation of the designated parameters on the x-y plane. In a conventional 3×3 filter, nine multiplication operations are performed for one image data. However, in the present invention, only two multiplication operations are required, so that high-speed operation can be performed.

Another embodiment of an image data processing apparatus of the present invention will now be described with reference to FIGS. 9 and 10.

Figure 9:
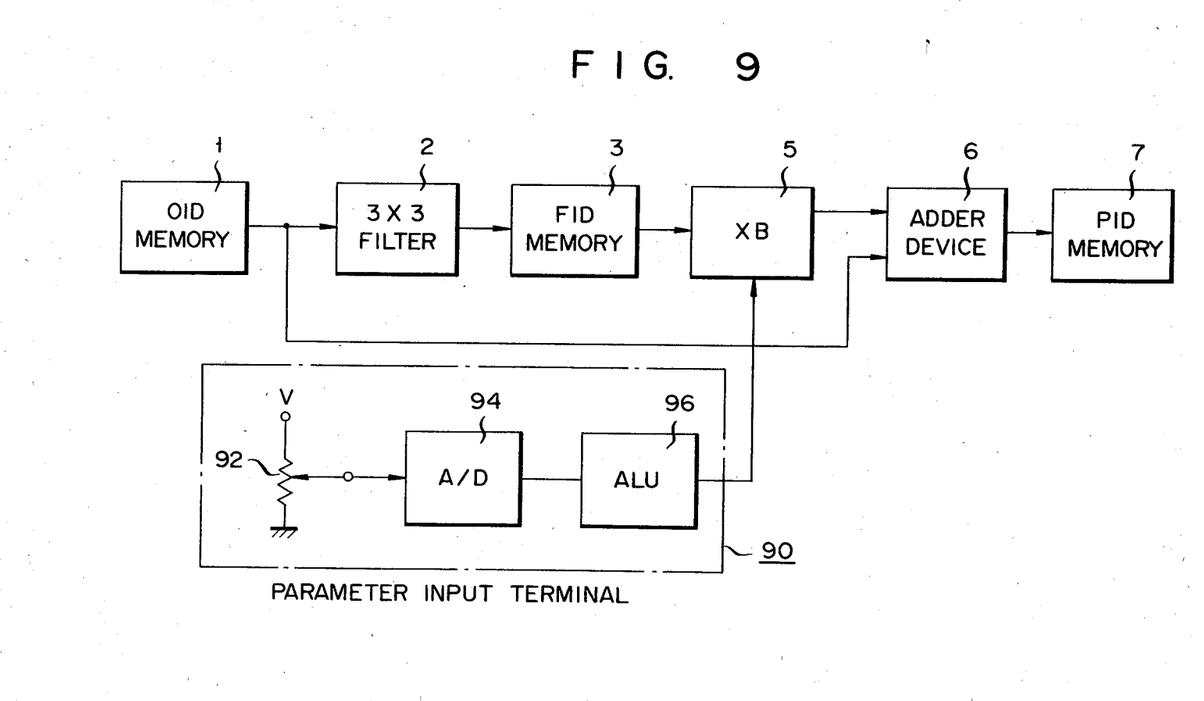
FIG. 9 shows a schematic diagram of an image data processing apparatus according to another preferred embodiment.

The configuration of the embodiment shown in FIG. 9 remains basically the same as that of the first embodiment and will only be simply described. The same reference numerals as used in FIG. 1 denote the same parts in FIG. 9. An original image data memory (to be referred to as OID memory) 1 stores original image data to be filtered. The original image data in the OID memory 1 is read out and is supplied to a 3×3 filter 2. The smoothening 3×3 filter 2 adds together the data of each given pixel with data of the eight surrounding pixels having a given pixel as its center. The filter 2 filters the sum data as the pixel data of the given pixel and the filtered image data from the filter 2 is supplied to and stored in a filtered image data storage memory (to be referred to as FID memory) 3. The image data filtered by the 3×3 filter 2 and stored in the memory 3 is read out therefrom and is supplied to a multiplier 5. The multiplier 5 multiplies the filtered image data by a parameter B set for the original image data. The product from the multiplier 5 is supplied to an image data adder device (to be referred to as adder device) 6. The adder device 6 also receives the pixel data of the original image data from the memory 1. The adder device 6 adds the two input data and supplies the sum data to a processed image data memory (to be referred to as FID memory) 7. A parameter B of the multiplier 5 is generated from a parameter input terminal 90 in the following manner. That is, a DC voltage +5 V is divided by a variable resistor 92, and the resultant voltage is supplied to an A/D converter 94 which supplies a digital signal to an ALU 96. The ALU 96 calculates the parameter B.

As may be apparent from the configuration as described above, in this embodiment only one parameter B can easily be set by a single variable resistor 92.

When various parameters are used for one original image data, the image data filtered by the 3×3 filter 2 and stored in the memory 3 is read out for each such parameter. Then, the original image data and the filtered image data are subjected to linear combination by the adder device 5. Thus, high-speed processing can be achieved. When the readout timings from the memories 1 and 3 are synchronized for performing addition of the original image data and the filtered image data for the same pixel, the image data of this pixel is supplied to the adder device 6 and the sum data is supplied to the memory 7. Accordingly, when the contents of the memory 7 are read out and displayed by an image display device, an image in which the original image data and the filtered image data are weighted by desired coefficients can be displayed.

Figure 10:
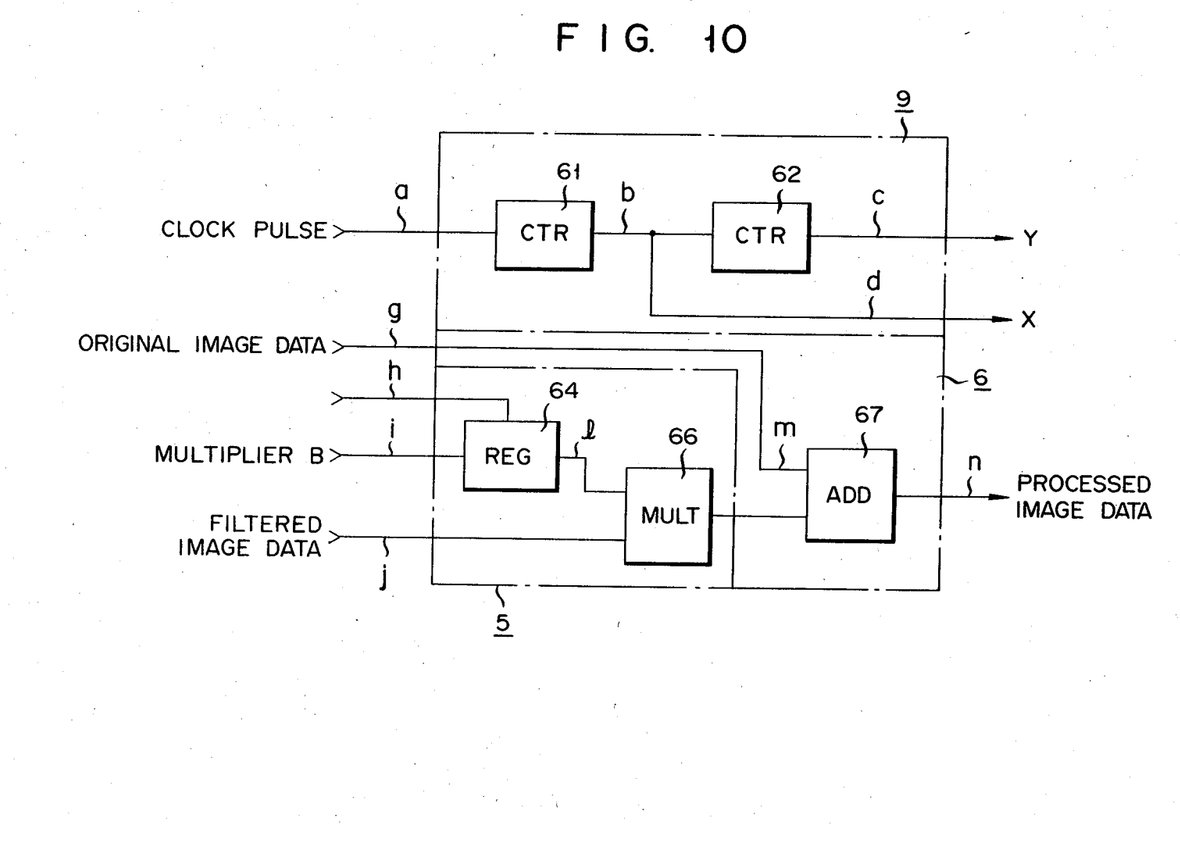
FIG. 10 shows a schematic diagram of the multiplier and the adder device of the apparatus shown in FIG. 9.

FIG. 10 shows the multiplier 5 and the adder device 6 for weighting and adding the original image data and the filtered image data from the 3×3 filter. Referring to FIG. 10, a clock pulse a is frequency-divided by a counter 61 which produces a signal b. The signal b is supplied to another counter 62 which frequency-divides the signal b and produces a signal c. The signals d and c are used as x- and y-address signals for accessing the memories 1, 3 and 7, shown in FIG. 9. Readout of the input image data and writing of the processed image data are performed by scanning one line after another from the left toward the right of the image. The readout original image data is supplied as g, and filtered image data is supplied as j. A register 64 stores a parameter B from the variable resistor 92 shown in FIG. 9. A multiplier element 66 calculates the product of the filtered image data and the parameter B, and the obtained product is added to the original image data by an adder 67, thus performing linear combination. The obtained result is stored in an address of the memory 7 which is accessed by the x- and y-address signals d and c.

The mode of operation of the embodiment described above may be summarized as follows. A single parameter is input by a parameter input means of an extremely simple configuration, e.g., a variable resistor. When the parameter is minimal, flat spatial frequency characteristics (equal to the original image) are obtained. As the parameter increases, high-frequency components (edge) are gradually enhanced. In this manner, the original image data is subjected to spatial frequency processing for variable spatial frequency characteristics.

As a result, the addition ratio of the filtered image data to the original image data can be changed by adjusting the variable resistor 92. The ratio of the image data which has been subjected to edge enhancement to the original image data is increased, and images for varying ratios of such image data can be displayed. This facilitates diagnosis and allows the formation of various composite images, so that the data of the image can be freely reproduced in a desired manner. Furthermore, since in the present invention the original image data and the filtered image data are stored in separate memories and are weighted separately by desired weight coefficients, a complex operation need not be performed. High-speed operation can be performed, and desired composite images can be obtained within a short period of time, thereby facilitating easy diagnosis.

The present invention is not limited to the particular embodiments described above, and various changes and modifications may be made within the spirit and scope of the present invention. For example, in the embodiments described above, a 3×3 filter is used for smoothing the image data. However, the present invention is not limited to this. A series of processing steps such as filtering, weighting and addition can be replaced by software to be executed by a computer.

In the embodiments described above, the 3×3 filter 2 has a smoothening function. However, a filter having an edge enhancing function can be used.

What is claimed is:

1. A filtering apparatus for digital image data comprising:
    first memory means for storing original image data;
    filtering means for smoothening said original image data derived from said first memory means to produce smoothened image data;
    second storage means for storing said smoothened image data derived from said filtering means;
    first multiplier means for multiplying said smoothened image data, derived from said second storage means, by a first constant;
    second multiplier means for multiplying said original image data, derived from said first memory means, by a second constant;
    adder means for adding said smoothened image data multiplied by said first constant to said original image data multiplied by said second constant to produce filtered image data; and
    control means for adjusting said first constant and second constant to vary characteristics of said filtered image data.

2. An image data processing apparatus as claimed in claim 1, wherein:
    further comprising third storage means for storing said filtered image data which is derived from said adder means.

3. An image data processing apparatus as claimed in claim 1:
    said adder means further comprising an address signal generating circuit for frequency-dividing clock pulse signals so as to generate the address signals which are used to access said first and second storage means.

4. An image data processing apparatus as claimed in claim 1, further comprising a parameter input terminal means including a first parameter generator comprising a first variable resistor for producing a first DC voltage, a first analog/digital converter for converting said first DC voltage into a corresponding first digital value, and a first arithmetic logic unit for performing an arithmetic logic operation so as to obtain said first constant from said first digital value, and a second parameter generator comprising a second variable resistor for producing a second DC voltage, a second analog/digital converter for converting said second DC voltage into a corresponding second digital value and a second arithmetic logic unit for performing an arithmetic logic operation so as to obtain said second constant from said second digital value.

5. An image data processing apparatus as claimed in claim 4,
    said parameter input terminal means further including an operation panel on which a plurality of spatial frequency characteristic curves are illustrated and which is electrically coupled to said first and second parameter generators, whereby when one of said spatial frequency characteristic curves is designated, said first and second parameter generators produce the corresponding first and second constants.

6. An image data processing apparatus as claimed in claim 1, wherein:
    all coefficients of said filtering means are selected to be "1".

7. A filtering apparatus for digital image data comprising:
    first memory means for storing original image data;
    filtering means for smoothening said original image data derived from said first memory means to produce smoothened image data;
    second storage means for storing said smoothened image data derived from said filtering means;
    multiplier means for multiplying said smoothened image data, derived from said second storage means, by a constant;
    adder means for adding said smoothened image data multiplied by said constant and said original image data derived from said first memory means to produce filtered image data; and
    control means for adjusting said constant to vary characteristics of said filtered image data.

8. An image data processing apparatus as claimed in claim 7,
    further comprising third storage means for storing said filtered image data which is derived from said adder means.

9. An image data processing apparatus as claimed in claim 7:
    said adder means further comprising an address signal generating circuit for frequency-dividing clock pulse signals so as to generate the address signals which are used to access said first and second storage means.

10. An image data processing apparatus as claimed in claim 7, further comprising a parameter input terminal means including a variable resistor for producing a DC voltage, an analog/digital converter for converting said DC voltage into a corresponding digital value and an arithmetic logic unit for performing an arithmetic logic operation so as to obtain said constant from said digital value.

11. An image data processing apparatus as claimed in claim 7, wherein:
    all coefficients of said filtering means are selected to be "1".

* * * * *